United States Patent [19]
Takahashi et al.

[11] Patent Number: 6,032,098
[45] Date of Patent: Feb. 29, 2000

[54] AUTOMATIC TRAVEL GUIDING DEVICE FOR VEHICLE

[75] Inventors: Tsuneo Takahashi; Toshiyuki Nozaka; Akira Iiboshi; Kenshirou Hashimoto, all of Wako, Japan

[73] Assignee: Honda Giken Kogyo Kabushiki Kaisha, Tokyo, Japan

[21] Appl. No.: 08/631,361

[22] Filed: Apr. 12, 1996

[30] Foreign Application Priority Data

Apr. 17, 1995 [JP] Japan .................................... 7-127002

[51] Int. Cl.[7] ................................................. G06F 165/00
[52] U.S. Cl. ........................................... 701/210; 701/301
[58] Field of Search ................................. 701/23, 25, 26, 701/27, 28, 209, 210, 301; 318/580, 587; 395/94

[56] References Cited

U.S. PATENT DOCUMENTS

| | | | |
|---|---|---|---|
| 4,792,907 | 12/1988 | Ikeda et al. | 701/208 |
| 5,119,301 | 6/1992 | Shimizu et al. | 701/217 |
| 5,442,559 | 8/1995 | Kuwahara et al. | 701/208 |
| 5,654,892 | 8/1997 | Fujii et al. | 701/210 |
| 5,751,107 | 5/1998 | Saranagpani | 701/210 |
| 5,774,073 | 6/1998 | Maekawa et al. | 701/210 |
| 5,774,824 | 6/1998 | Striet et al. | 701/210 |

FOREIGN PATENT DOCUMENTS 63-3114414  12/1988  Japan .

*Primary Examiner*—William A. Cuchlinski, Jr.
*Attorney, Agent, or Firm*—Lyon & Lyon LLP

[57] ABSTRACT

An automatic travel guiding device is a combination of a navigation control unit and automatic travel control unit that judges the position of a vehicle on a travelling road on the basis of sensed circumstances of the road extending ahead of the vehicle and correcting a current position of the vehicle to a corresponding position on the road map. The device includes means for correcting road circumstances on the basis of road data read from map-information storage medium according to the current position of the vehicle to correlatively increase both the current position accuracy and the travel control accuracy according to travel guiding instruction for following a target course preset on a road map by sensing actual road conditions and to realize automatic travel control at an increased accuracy.

9 Claims, 6 Drawing Sheets

AUTOMATIC TRAVEL GUIDING DEVICE FOR VEHICLE

BACKGROUND OF THE INVENTION

The present invention relates to an automatic travel guiding device for use in a vehicle, which device is capable of guiding the vehicle to travel a path tracing a target travel course preset on a road map indicated on a display screen.

Japanese Laying-open patent No. 3-231311 discloses such a conventional automatic travel guiding device that is a combination of an automatic travelling device, which is capable of controlling a vehicle to travel at a suitable running speed, tracing a road pattern in a two-dimensional plane obtained on the basis of road components extracted from a front road image taken through an image pick-up camera attached to the vehicle, and a navigation device, which is capable of guiding the vehicle to travel along a path tracing a target course preset on a road map and determining a current position of the vehicle on said road map. With this automatic travel guiding device, a road whereon the vehicle must run is recognized among the road patterns obtained from the road images taken by the pick-up camera, according to travel guiding instruction, e.g., for turning to the right or left, which was given by the navigation device, and the vehicle is controlled to follow the recognized road.

In the above-mentioned conventional system, an automatic travelling device is combined with a navigation device in such a way that the latter gives guiding information to the former. Consequently, to improve the accuracy of the automatic travel guiding device, it is necessary to separately improve the accuracy of the current position of the vehicle on the road map, which is determined by the navigation system, and the accuracy of the vehicle travel control according to road conditions (e.g., road patterns) detected from a forward extending road image taken through the pick-up camera attached to the vehicle.

SUMMARY OF THE INVENTION

Accordingly, a primary object of the present invention is to provide an automatic travel guiding device for use in a vehicle, which is capable of correlatively improving the accuracy of locating a current position of a vehicle on a road map and the accuracy of travel control according to road conditions obtained by sensing the object ahead of the vehicle by using advantageous features of both a navigating portion and a travel-control portion.

Another object of the present invention is to provide an automatic travel guiding device for use in a vehicle, which is provided with means for recognizing a location of the vehicle on a current travelling road from the road circumstances sensed ahead of the vehicle and for bringing the current position of the vehicle to a corresponding position on the road map.

Another object of the present invention is to provide an automatic travel guiding device for use in a vehicle, which is provided with means for correcting the sensed road circumstances on the basis of road data read from a road-map-information storage medium according to a current position of the vehicle.

Figure 1:
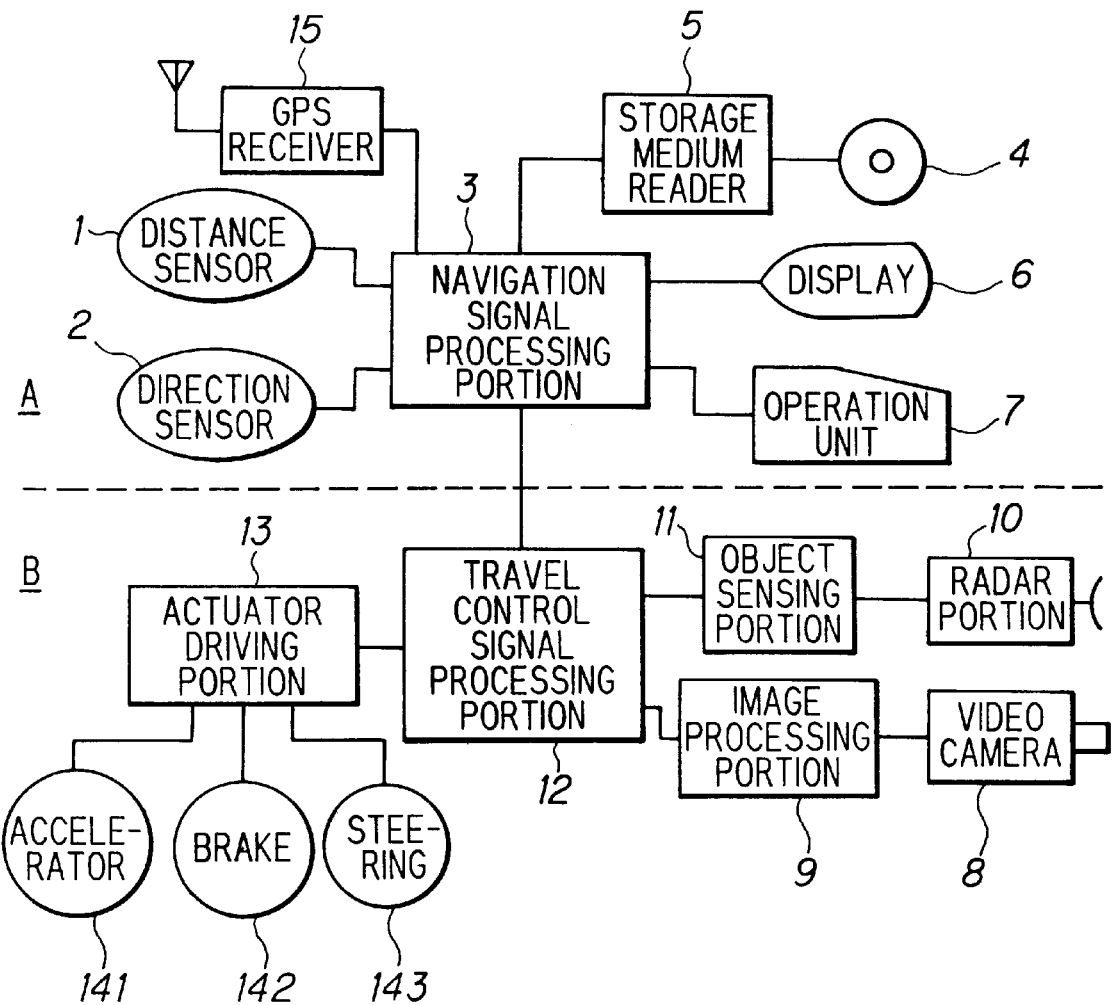
FIG. 1 is a block diagram showing a structure of an automatic travel guiding device embodying the present invention.

In the above-mentioned figures, following reference characters are used: A is a navigation control portion, B is an automatic travel control portion, 1 is a distance sensor, 2 is a direction sensor, 3 is a navigation signal processing portion, 4 is a map information storage medium, 5 is a storage medium reader, 6 is a display unit, 7 is a operation control unit, 8 is a video-camera, 9 is a image processing portion, 10 is a radar unit, 11 is an obstruction sensor, 12 is a travel control signal processing portion, 13 is an actuator driving portion, 141 is an accelerator, 142 is a brake, 143 is a steering unit and 15 is a GPS (Global Positioning System) receiver.

DESCRIPTION OF THE PREFERRED EMBODIMENTS

Referring to FIG. 1, there is shown an automatic travel guiding device embodying the present invention, which is used in a vehicle and which is composed mainly of a navigation control portion A and an automatic travel control portion B. The navigation control portion A basically comprises a distance sensor 1 for detecting a running distance of a vehicle, a direction sensor 2 for detecting a running direction of the vehicle; a GPS receiver 15; a navigation signal processing portion 3 consisting of a computer system which determines a position of the vehicle every unit of time on the basis of GPS signals received by the GPS receiver 15, determines a current position of the vehicle on a road map, when the receiving wave stops, by sequentially calculating X- and Y-coordinates of current vehicle position per unit running distance from the start point on the basis of the detected running distance and the detected running direction, sequentially stores the obtained current position data in the form of travelled trace information, controls the navigation of the vehicle to follow a course from the start point to the target points, which is preset on the road map, and performs the control of the entire system; a map information storage medium 4 for storing digitized road-map information; a storage medium reader 5 for selectively reading road-map information of a specified area from the storage medium 4; a display portion 6 for displaying the selected area road-map on a display screen on the basis of the read-out road-map information and renewably displaying a mark that indicates the running direction of the vehicle at its current position on the road map and that moves thereon as the vehicle moves; and an operation control unit 7 for providing the navigation signal processing portion 3 with operation commands including commands for selecting a desired road map to be presented on the display portion 6, setting a starting point and a target point for the vehicle on the road map, indicating a travel trace, changing settings for the display, e.g., enlargement of a part of the map, indication of the travel trace and a magnification factor of the entire screen image.

The navigation signal processing portion 3 searches an optimal course between a start point and a target point preset on a road map by evaluating travel-cost-related variables such as travelling distance and travelling time on the basis of digitized road-map data read from the map storage medium 4.

The navigation signal processing portion 3 stores the searched course data in an internal storage, indicates in a special color the searched course on the road map indicated on the display screen and guides the vehicle so that its current position may follow the specially colored optimal course from the start point to the target point.

When the navigation signal processing portion 3 detects the vehicle current position, for example, at a specified distance from an upcoming crossing where the vehicle must turn to the right, it outputs a travel guiding instruction to turn to the right at that crossing.

The above-mentioned optimal course from a start point to a target point can be searched by using a conventional searching method.

It is possible to provide the navigation signal processing portion 3 with a radio receiver for receiving traffic information for searching a travelling course, avoiding roads jammed with cars or closed due to an accident or repairing.

The navigation signal processing portion 3 also allows a driver to manually set a travelling course by specifying an existing crossing as a guiding mark instead of automatic searching an optimal course from a start point to a target point.

It is also possible to determine a current position of the vehicle on the road map by cumulatively calculating X- and Y-coordinates of the vehicle from the detected signals of the vehicle running distance and direction and to correct an error of measurement made by using the GPS electronic navigation system.

It is, of course, possible to determine a current position of the vehicle on the road map by using the GPS electronic navigation system.

Figure 9:
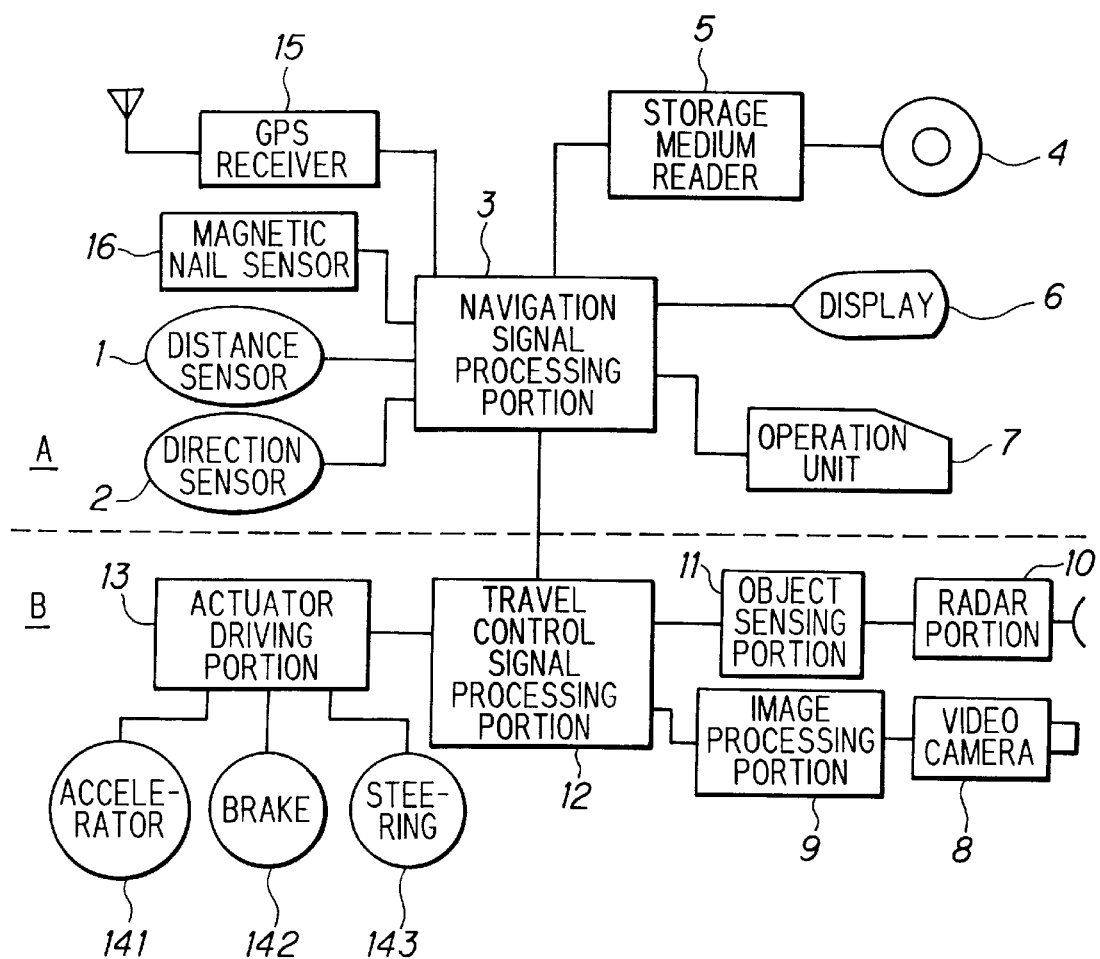
FIG. 9 is a block diagram similar to FIG. 1 of a modified form the automatic travel guiding device of this invention.

There also is a known vehicle that is provided with a magnetic nail sensor, which vehicle travels on a specified road with magnetic nails embedded therein at constant intervals and has a magnetic nail sensor 16 for sensing said nails. (see FIG. 9). In this case, the navigation signal processing portion 3 can determine a current position of the vehicle on the specified road by counting the number of the sensed nails.

The automatic travel control portion B basically comprises a video-camera 8 attached to the vehicle so as to be continuously picking-up sequential images of the road area ahead of the vehicle; an image processing portion 9 for extracting road-image components such as continuous line segments and white road edges from the images taken by the video-camera; a radar 10 attached to the vehicle so as to search every object in an area ahead of the vehicle; an obstruction sensor 11 for determining a position, in a two dimensional plane, of each obstruction detected by the radar 10; a travel-control-signal processing portion 12 comprising a computer system that can obtain a road pattern in an actual (two-dimensional) plane by projectively transforming the perspectively projected road components extracted by the image processing portion 9, receive position data of the obstructions sensed by the obstruction sensor 11 and control the vehicle to follow on the projectively transformed road pattern at a suitable running speed determined from a curvature of said road pattern and avoiding the obstructions; and a actuator driving portion 13 for selectively driving an accelerator 141, a brake 142 and a steering unit 143 according to various kinds of control signals generated by the travel-control-signal processing portion 12.

When the vehicle approaches a known travel direction change or alternative, e.g., a branching point in the road, the travel-control-signal processing portion 12 receives a navigating instruction from the navigation signal processing portion 3 of the navigation control portion A, recognizes a traceable road pattern among road patterns obtained from the picked-up images and controls the vehicle to travel in a desired manner, following the recognized road pattern.

The travel-control-signal processing portion 12 reads a legal speed limit for the current travelling road, which speed limit is previously stored in the map-information storage medium 4, and controls the vehicle to run the road at a determined suitable speed but sticking to the legal speed limit.

Items to be practically controlled by the travel-control-signal processing portion 12 are the same as those of a conventional travel-control method.

The embodiment of the present invention includes means to determine a position of the vehicle on the current travelling road according to sensed circumstances thereof and to correct the present position of the vehicle so as to bring it to the corresponding point on the road map.

In the embodiment, the travel-control-signal processing portion 12 recognizes current circumstances of the road whereon the vehicle is running on the basis of the front image taken through the video-camera and gives the resultant information to the navigation signal processing portion 3 which in turn rewrites the current position data to match the current position of the vehicle with the corresponding position on the road map.

Practically, the road branching state is recognized as one of the road circumstances, whereby the current position of the vehicle is corrected to be placed at the specified point relative to the branching point on the road map.

Figure 2:
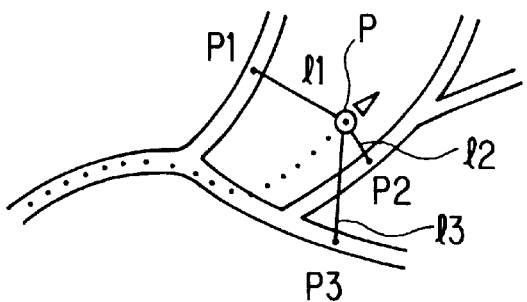
FIG. 2 is a view showing a relationship between a current position temporarily set on a road indicated on a road map and a vehicle's position currently indicated out of the road on the road map.

A calculated current position P of the vehicle may be deviated, as shown for example in FIG. 2, out of the road as a result of accumulated positioning errors. In this case, presumed current positions P1, P2 and P3 are temporarily set on every road existing within a specified distance from the current position P and are given the respective priority order numbers by their distances l1, l2 and l3 from the calculated current position P. The position P2 having the shortest distance l2 of top priority is selected and data on the road whereon the position P2 exists is read-out. The position P2 is judged to be a true current position if the road has a branching point ahead of the position P2. In this case, data of the current position P is rewritten so that the presumed current position P2 may represent a true current position.

If no branching point exits on the road ahead of the point P2, the position P1 having the second priority is marked and the related road data is readout. The position P2 is judged to be a true current position if there is a branching point on the road ahead of the position P2. If not, the position P3 of the next priority is marked and checked in the same manner.

Figure 3:
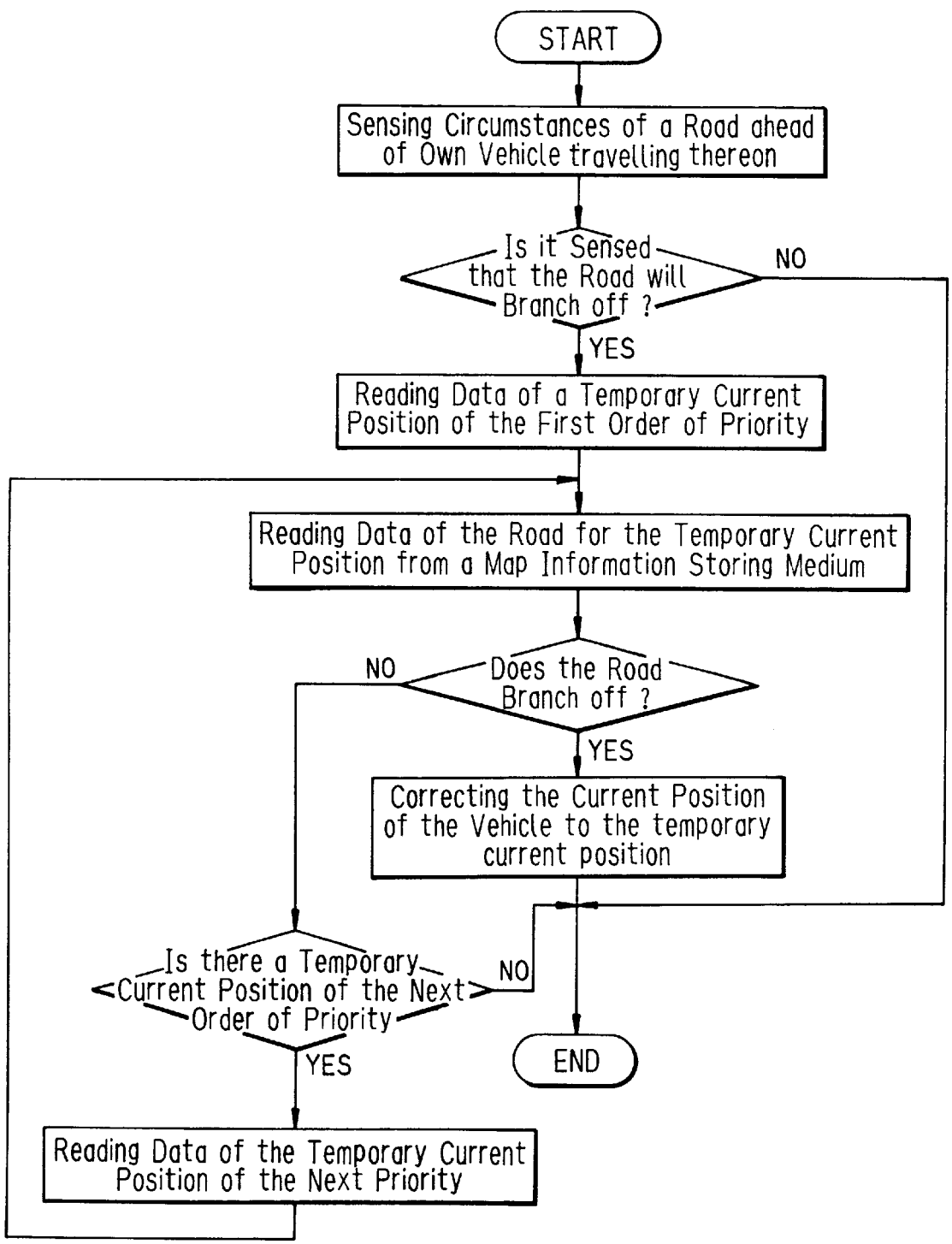
FIG. 3 is a flow chart for correcting a current position when a road is judged to be branched soon.

FIG. 3 is a flow chart of processing steps for correcting the current position when a road is recognized to be forked.

It is possible to previously provide the road map with data on objects existing along every road on the road map, which can be recognized through an image taken by the video-camera when the vehicle travels on that road. In this case, any object is recognized as circumstances of the road whereon the vehicle is travelling and the current position may be corrected in reference to the recognized object so as to be placed at a correct point on the road map.

It is also possible to recognize a road sign in an image taken through the video-camera as circumstances of the road whereon the vehicle is running and to determine whether the vehicle is running on a highway or not by the indication of the maximum allowable speed on the road sign and/or by the color of characters on the sign or the color of the sign itself. In this case, the current position of the vehicle may be corrected with reference to the recognized road sign, i.e., to be indicated at a corresponding place on a highway or a general road on the road map.

When the vehicle is judged, for example, to be running on a highway according to the road circumstances recognized by the travel-control-signal processing portion 12, the navigation signal processing portion 3 recognizes the class of the road whereon the current position exists according to the map information and, if the road is not highway, searches a highway existing within a specified distance from the current position. If there is a highway, the current position is corrected to be at a nearest position on the highway.

Even if a general road runs under or in parallel with a highway road, the above-mentioned embodiment can judge on which road the vehicle is travelling, thereby assuring correct determination of the current position on the road map.

The automatic travel guiding device according to the present invention is also capable of correcting data on the sensed circumstances on the basis of road data read from the map-information storage medium according to the current position of the vehicle.

Figure 4:
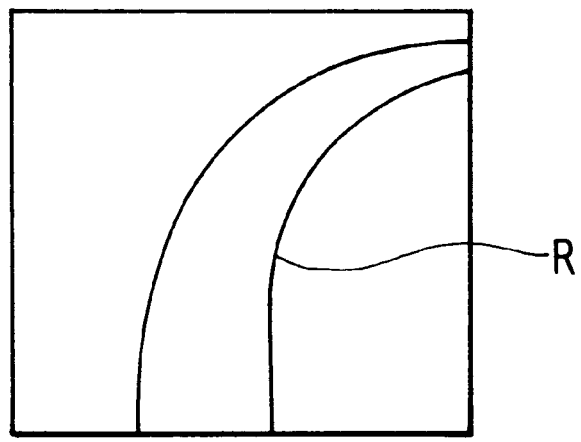
FIG. 4 shows an example of a road component extracted from a taken image.

For example, it is supposed that the automatic travel control portion B obtained a road pattern shown in FIG. 15 in a two-dimensional plane by projectively transforming road components R (FIG. 4) extracted from an image taken through the video-camera 8.

Figure 6:
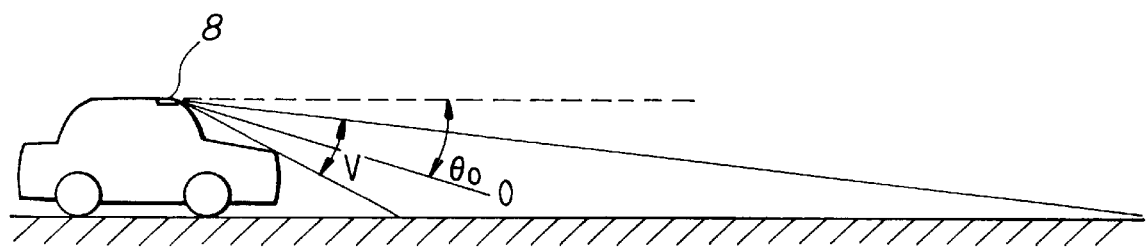
FIG. 6 illustrates a state of taking an image of a forward extending road-area by a video-camera attached to a vehicle when running on a flat road.
Figure 7:
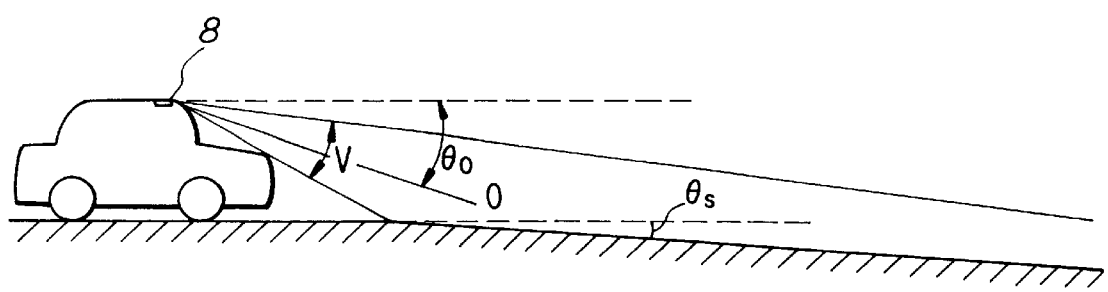
FIG. 7 illustrates a state of taking an image of a forward extending road-area by a video-camera attached to a vehicle when running on a slope.

In this case, the video-camera 8 is attached to the vehicle so as to have a constant depression angle θo as shown in FIGS. 6 and 7 and, therefore, a road pattern in a two-dimensional plane obtained by projective transformation may differ from the actual when the forward extending road rises and falls. Consequently, a desired running speed calculated from a curvature of the obtained road pattern may include an error.

In case of the road descending forward as shown in FIG. 7, a road pattern obtained by projective transformation may have a loosely calculated curvature, resulting in obtaining a running speed higher than a suitable one.

To avoid this, data on up-and-down inclination of each road is previously included in the road map information. The navigation signal processing portion 3 reads data on inclination of a current travelling road and data on inclination of a forward extending part of the road from the map-information storage medium 4 according to the current position of the vehicle and gives data on a differential angle θs (an inclination of the road viewed forward from the vehicle) to the travel-control-signal processing portion 12.

The travel-control-signal processing portion 12 performs arithmetic operations for projective transformation of road components by previously adding the differential angle θs to the depression angle θo of the video-camera attached to the vehicle. The curvature of the road pattern in the two-dimensional plane therefore can be calculated at an increased accuracy as compared with the value calculated without consideration of the differential angle θs.

In FIGS. 6 and 7, the letter V represents an image pick-up angle of the video-camera 8 and the letter O represents a center line of the video-camera.

Figure 5:
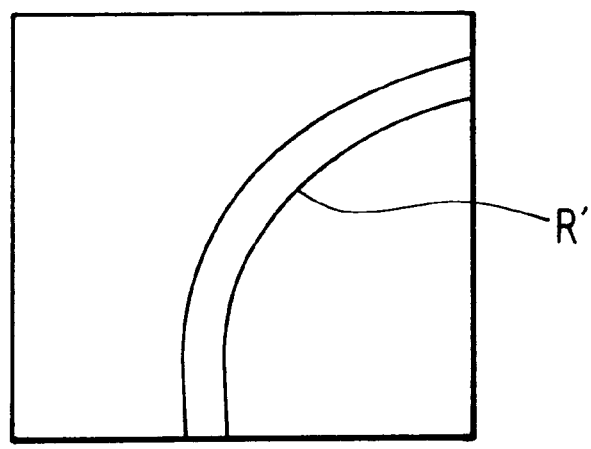
FIG. 5 shows an example of a road pattern shown in a two-dimensional plane, which is obtained through projective transformation of road components extracted from a taken image.
Figure 8:
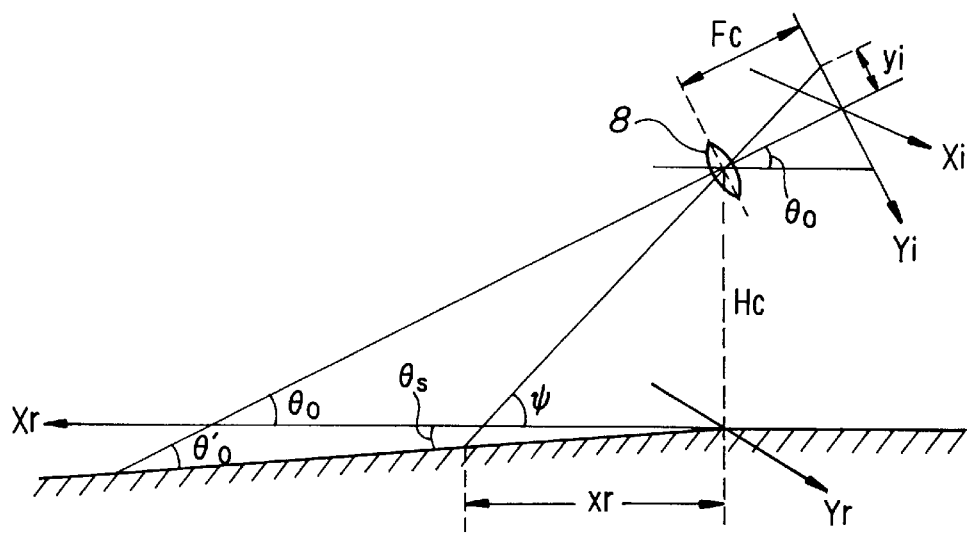
FIG. 8 shows a correlation between coordinates of an image taken by a video-camera and coordinates of two-dimensional plane of projective transformation.

In FIG. 8, Xi and Yi are coordinates on an image (FIG. 4) and Xr and Yr are coordinates on a two-dimensional plane (FIG. 5). Supposing that the video camera 8 has a focal length Fc and is fixed at a depression angle θo and at a level Hc, the following equations are obtained:

$$\text{Tan } \theta = Hc/xr \quad (1)$$

$$\theta = \theta o - atan(yi/Fc) \quad (2)$$

From equations (1) and (2), the following equation (3) is obtained $$xr = Hc/\tan\{\theta o - atan(yi/Fc)\} \quad (3)$$

A value "yr" can be determined according to the following equation (4).

$$yr = -xi\sqrt{(Fc)^2 + (yi)^2} / \sqrt{(xr)^2 + (yr)^2} \quad (4)$$

Equations (3) and (4) are projective transformation equations.

When a forward extending part of the road whereon the vehicle is running inclines at a differential angle θs, an accurate depression angle θo' is determined by an equation θo−θs and the road pattern obtained in the two-dimensional plane Xr−Yr by projective transform can be corrected by substituting θo' for θo in the equation (3).

It is also possible that the navigation signal processing portion 3 reads data on the curvature of a forward extending road and data on the curvature of a currently travelling road, both of which are previously included in the road map information stored in the map information storage medium 4 and gives differential curvature data (data on a curvature of the road viewed forward from the vehicle) to the travel-control-signal processing portion 12 which in turn corrects a road pattern obtained by projective transformation.

In the automatic travel guiding device according to the present invention, the video-camera 8 and the radar 10 sense circumstances of a road extending ahead of the vehicle, and the travel-control-signal processing portion 12 receives a guiding instruction from the navigation signal processing portion 3 and judges whether any moving obstruction exists on the travelling road or not. It controls the vehicle to run slowly or stop for safety if any moving obstruction is recognized on the road.

In this case, it is effective to use the road map information in which road attachment data such as road signs, guard rails and other fixtures are previously included. The navigation signal processing portion 3 reads data on attachments of the current travelling road from the map-information storage medium 4 and discriminates whether a static object found by the radar 10 corresponds to the road attachment or not. If not, the found object is judged to be a movable obstruction and the vehicle is controlled to run slowly or stop for safety.

As is apparent from the foregoing, an automatic travel guiding device according to the present invention is a combination of a navigation control unit and automatic travel control unit, in which means to judge a position of a vehicle on a travelling road on the basis of sensed conditions of the road extending ahead of the vehicle and correct a current position of the vehicle to a corresponding position on the road map and means to correct road conditions on the basis of road data read from map-information storage medium according to the current position of the vehicle are provided to correlatively increase both the current position accuracy and the travel control accuracy according to travel guiding instruction for following a target course preset on a road map by sensing actual road conditions and to realize automatic travel control at an increased accuracy.

What is claimed is:

1. An automatic travel guiding device for use in a vehicle, which device is capable of automatically guiding the vehicle to follow a target course preset on a road map by searching a current position of the vehicle on the road map and, at the same time, of sensing road circumstances, recognizing a forward extending road on the basis of the obtained road circumstances and automatically controlling the vehicle to follow the recognized road, characterized in that the device is provided with means for judging a position of the vehicle on the travelling road from the sensed road circumstances and automatically correcting the current position of the vehicle on the road to be located at a corresponding point on the road map.

2. An automatic travel guiding device as defined in claim 1, characterized by sensing a branching point of a road as said road circumstances and automatically correcting a current position of the vehicle on the road to be located at a corresponding position on a road map with reference to the sensed branching point.

3. An automatic travel guiding device as defined in claim 1, characterized by sensing a road sign as said road circumstances, judging the road sign to relate to a highway only and automatically correcting a current position of the vehicle on the road to be located at a corresponding position on a road map with reference to the sensed road sign.

4. An automatic travel guiding device for use in a vehicle, which device is capable of automatically guiding the vehicle to follow a target course preset on a road map by searching a current position of the vehicle on the road map and, at the same time, of sensing road circumstances, recognizing a forward extending road on the basis of the obtained road circumstances and automatically controlling the vehicle to follow the recognized road, characterized in that the device is provided with means for correcting sensed road circumstances on the basis of road data read from a roadmap information storage medium according to the current position of the automatically controlled vehicle.

5. An automatic travel guiding device as defined in claim 4, characterized in that the road data is data on inclination angle of the road.

6. An automatic travel guiding device as defined in claim 4, characterized in that the road data is data on a curvature of the road.

7. An automatic travel guiding device for use in a vehicle, which device is capable of automatically guiding the vehicle to follow a target course preset on a road map by searching a current position of the vehicle on the road map and, at the same time, of sensing road circumstances, recognizing a forward extending road on the basis of the obtained road circumstances and automatically controlling the vehicle to follow the recognized road, characterized in that the device is provided with travel control means for sensing a moving obstruction on the road extending ahead of the vehicle and automatically controlling the vehicle to approach at a slow-speed or to stop, said travel control means also for sensing a static body on a road read from the road-map information medium, determining whether the static body corresponds to an existing installation on the basis of existing facilities data, and judging that a matter other than the existing facilities to be a moving body and automatically controlling the vehicle to approach at a slow speed and stop.

8. An automatic travel guiding device for use in a vehicle, which device has means for automatically guiding the vehicle to follow a target course preset on a road map by searching a current position of the vehicle on the road map, sensing road circumstances, recognizing a forward extending road on the basis of obtained road conditions, and automatically controlling the vehicle to follow the recognized road, an improvement comprising at least one of;

means for judging a position of the vehicle on the travelling road from the sensed road circumstances and automatically correcting the current position of the vehicle on the road to be located at a corresponding point on the road map, means for correcting sensed road circumstances on the basis of road data read from a road-map information storage medium according to the current position of the automatically controlled vehicle, and travel control means for sensing a moving obstruction on the road extending ahead of the vehicle and automatically controlling the vehicle to approach at a slow-speed or to stop, said travel control means also sensing a static body on a road read from the road-map, determining whether the static body corresponds to an existing installation on the basis of existing facilities data, and judging that a matter is other than the existing facilities to be a moving body and automatically controlling the vehicle to approach at a slow speed and stop.

9. An automatic travel guiding device for use in a vehicle, which device has means for automatically guiding the vehicle to follow a target course preset on a road map by searching a current position of the vehicle on the road map, sensing road circumstances, recognizing a forward extending road on the basis of obtained road conditions, and automatically controlling the vehicle to follow the recognized road, an improvement comprising;

means for judging a position of the vehicle on the travelling road from the sensed road circumstances and automatically correcting the current position of the vehicle on the road to be located at a corresponding point on the road map, means for correcting sensed road circumstances on the basis of road data read from a road-map information storage medium according to the current position of the automatically controlled vehicle, and travel control means for sensing a moving obstruction on the road extending ahead of the vehicle and automatically controlling the vehicle to approach at a slow-speed or to stop, and for sensing a static body on a road read from the road-map, determining whether the static body corresponds to an existing installation on the basis of existing facilities data, and judging that a matter is other than the existing facilities to be a moving body and then automatically controlling the vehicle to approach at a slow speed and stop.

* * * * *